Figure 1:
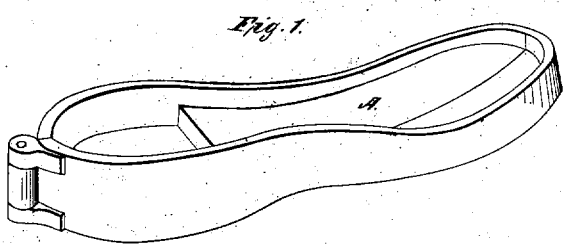

J. M. Wimley,
Shoe Sole,

No. 1,580.

Reissued Nov. 24, 1863.

Witnesses:
Ben Morrison
E. P. Mann

Inventor:
John M. Wimley

N. PETERS, PHOTO-LITHOGRAPHER, WASHINGTON, D. C.

UNITED STATES PATENT OFFICE.

PRESTON WARE, JR., OF NEWTON, MASSACHUSETTS, ASSIGNEE, BY MESNE ASSIGNMENTS, OF JOHN M. WIMLEY.

IMPROVEMENT IN BOOTS AND SHOES WITH COMPOSITION SOLES.

Specification forming part of Letters Patent No. 14,216, dated February 5, 1856; Reissue No. 1,580, dated November 24, 1863.

DIVISION NO. 3.

*To all whom it may concern:*

Be it known that JOHN M. WIMLEY, of the city and county of Philadelphia, and State of Pennsylvania, did invent a new and useful method or mode of constructing or making composition soles, and of attaching the same to boots and shoes; and I hereby declare that the following is a full, clear, and exact description thereof, reference being had to the accompanying drawings, and to the letters of reference marked thereon.

Soles of boots and shoes were heretofore most generally made of leather, this material being peculiarly adapted to this purpose, because of its durability and the facility with which they may be secured to the uppers by sewing, pegging, nailing, or other mechanical means; but leather soles, besides being more or less pervious to water, are costly, both on account of their material and the labor involved in cutting, fitting, trimming, and other operations attending their construction and attachment to the uppers. Attempts at producing a cheaper and in some respects a better article as a substitute for leather soles resulted in the production of composition soles—*i. e.*, soles made or formed in molds of some plastic material which, after being molded, undergoes a change, whereby it becomes hard, tough, flexible, or elastic, impervious to water, and more or less resisting to tear and wear. The great difficulty experienced in the employment and introduction of these composition soles consisted in attaching them to boots and shoes. Numerous experiments tried to attach them by means of pegs, nails, rivets, or other mechanical means failed, because, unlike the leather, whose texture is interwoven and continuous, the composition sole, which is composed of small particles agglomerated or cemented together, cannot be pierced, cut, or trimmed without at the same time destroying its durability and imperviousness. Cementing substances have therefore been resorted to to fasten composition soles to boots or shoes; but, while soles so fastened become easily detached under the influence of changes in the weather, they require in most cases an intermediate sole, (attached to the upper by mechanical means,) to which they may be cemented.

From this statement of the condition of the art previous to the date of this invention the object and value of this invention will be more fully understood.

The invention subject of this patent relates to the manufacture of composition soles and to the mode of attaching the same to boots and shoes, the object being to produce a composition sole which may be attached by mechanical means to boots and shoes without involving the necessity of piercing, cutting, or trimming the same, and so as to preserve its durability and imperviousness; and this invention consists in the production, as a new article of manufacture, of a shoe or boot the sole of which is made of composition and attached by means of staples or other metallic clinching devices partly embedded in or incorporated with the sole.

To enable others skilled in the art to make and use this invention, I shall now proceed to describe, in illustration thereof, the manner in which the same is or may be carried into effect, premising, however, that this invention is susceptible of many modifications without departure from the principle thereof, and that the example here given relates to the making and attaching of composition soles which are more particularly applicable to heavy boots and shoes.

Figure 2:
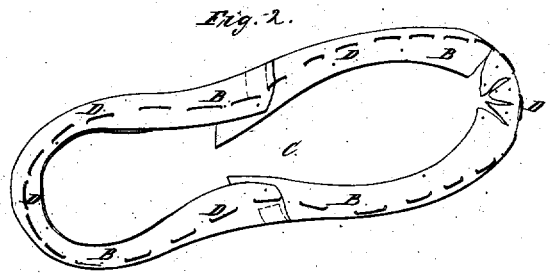
Figure 3:
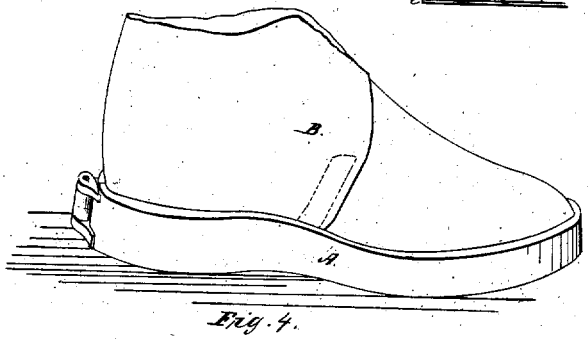
Figure 4:
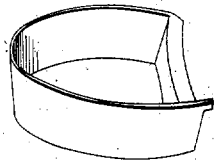

Referring to the drawings, Figure 1 is a perspective view of a cast-iron mold in which the sole is formed; Fig. 2, a like view of a shoe as prepared upon the last for the reception of the sole; Fig. 3, a like view of the shoe upon the mold; Fig. 4, a like view of a cast-iron heel which may be applied when required; and Fig. 5, a sectional side view of one of the iron staples inserted through the upper and insole for securing the outer sole to the boot or shoe, like letters indicating the same parts in the different figures.

Figure 5:
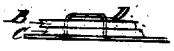

The mold A is made of cast-iron, and of such form as to produce a sole, as hereinafter described, and is divided longitudinally into two parts, which are hinged together at the heel, and so as to be readily opened and closed as occasion may require. The shoe or boot is lasted in the usual manner, the upper B being held down upon the insole C by means of temporary tacks in the usual manner preparatory to the insertion of the staples D D, by means of which the composition sole is permanently secured thereto. The staples D are formed of wire, the two ends being bent down at right angles and driven through the upper and insole, as shown in Fig. 2, so as to clinch on the inner side of the insole, as shown in Fig. 5, by coming in contact with the last, which at this part must be made or covered with metal. In order to cause the ends of the staples to clinch more readily, I usually reduce them to a flat edge with the hammer before driving them into the leather. In the operation of driving the staples I use a flat piece of hard wood or metal, which is about a sixteenth of an inch thick and about half an inch wide. After the staple is entered I place this tool between it and the upper, and then drive the staple down upon it, so that the ends of the staple become clinched or bent up against the inner side of the insole by the resisting last, and, the tool being then withdrawn, there is necessarily a space left between the upper and the staple. The staples D D being thus inserted around near the outer edge of the boot or shoe, as shown in Fig. 2, it is ready for receiving the composition sole. I make the composition for this purpose chiefly of gutta-percha.

The boot or shoe being ready for the outer sole, as before described, I put enough of the composition to form the said sole into warm water, which prevents its sticking to the hands in forming and molding. I now form it into near the required shape with the hands, and, if a very hard and durable sole is required, I also insert numerous metal plugs or short stub-nails into the under side. I then place it in the mold A, and immediately press the boot or shoe down upon it and hold the latter thus for a few minutes, when, the composition having become hard or "set," the mold may be opened and the boot or shoe taken out. The sole, being thus perfectly formed, is permanently held also to the same by means of the staples D D. I now blacken and varnish it in the usual manner, and it is ready for use.

When an iron heel is required, I construct it of malleable cast-iron in the form shown in Fig. 4, and place it in the mold before putting therein the composition. I then proceed as before described. The cast-iron heel, being rough on the inner side, or having small projections thereon, adheres firmly to the composition, and thus an exceedingly durable and substantial heavy heel is produced. In lighter boots and shoes I make the heels wholly of the composition, and also dispense with the metal plugs in the bottoms of the soles.

I sometimes use flat-headed nails instead of the staples D D for the purpose of holding on the soles, but I prefer the staples.

It will be evident that shoes or boots having soles of composition and attached in the manner substantially as described must be very durable and impervious to water, and also that they can be made very rapidly, and therefore cheaply, as the cost of the material does not exceed that of sole-leather.

Having thus fully set forth the nature of this invention and the manner in which the same is or may be carried into effect, what is claimed as the invention of the said JOHN M. WIMLEY, and as a new article of manufacture, is—

A shoe or boot the sole of which is made of composition and attached by means of staples or other metallic clinching devices partly embedded in or incorporated with the sole.

In testimony whereof I have signed my name to this specification before two subscribing witnesses.

PRESTON WARE, JR.

Witnesses:

E. DANIEL DOWNES,

WM. H. FURBER.